No. 757,443. PATENTED APR. 19, 1904.
F. DINWIDDIE.
PLOW.
APPLICATION FILED JULY 8, 1903.
NO MODEL. 3 SHEETS—SHEET 1.

WITNESSES:
E. F. Winkler
Benj. S. Brown

INVENTOR
Frank Dinwiddie
BY
Arthur B. Brown
ATTORNEY

No. 7,443. PATENTED APR. 19, 1904.
F. DINWIDDIE.
PLOW.
APPLICATION FILED JULY 8, 1903.

NO MODEL. 3 SHEETS—SHEET 2.

WITNESSES: INVENTOR
E. T. Winkler Frank Dinwiddie
Benj. H. Brown BY Arthur C. Brown
ATTORNEY No. 757,443. PATENTED APR. 19, 1904.
F. DINWIDDIE.
PLOW.
APPLICATION FILED JULY 8, 1903.
NO MODEL. 3 SHEETS—SHEET 3.

WITNESSES:
E. T. Winkler
Benj. S. Brown

INVENTOR
Frank Dinwiddie
BY
Arthur L. Brown
ATTORNEY

No. 757,443. Patented April 19, 1904.

UNITED STATES PATENT OFFICE.

FRANK DINWIDDIE, OF KANSAS CITY, MISSOURI.

PLOW.

SPECIFICATION forming part of Letters Patent No. 757,443, dated April 19, 1904.

Application filed July 8, 1903. Serial No. 164,703. (No model.)

*To all whom it may concern:*

Be it known that I, FRANK DINWIDDIE, a citizen of the United States, residing at Kansas City, in the county of Jackson and State of Missouri, have invented certain new and useful Improvements in Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My present invention relates to plows, and more particularly to that class of plows which may be designated as "fork-plows," and has for its object to provide a plow which will more satisfactorily prepare the ground for cultivation by spading and turning the soil instead of furrowing the same.

Heretofore it has been necessary in preparing the soil for crops to first furrow the soil by plowing and afterward harrow the same. With a plow constructed according to my invention both of the above steps are accomplished with one and the same machine at one and the same time, resulting in a saving of expense, time, and labor.

Further objects of my invention are to provide many improved details of structure hereinafter described, and shown in the accompanying drawings, in which like reference-numerals refer to like parts, and in which—

Figure 1:
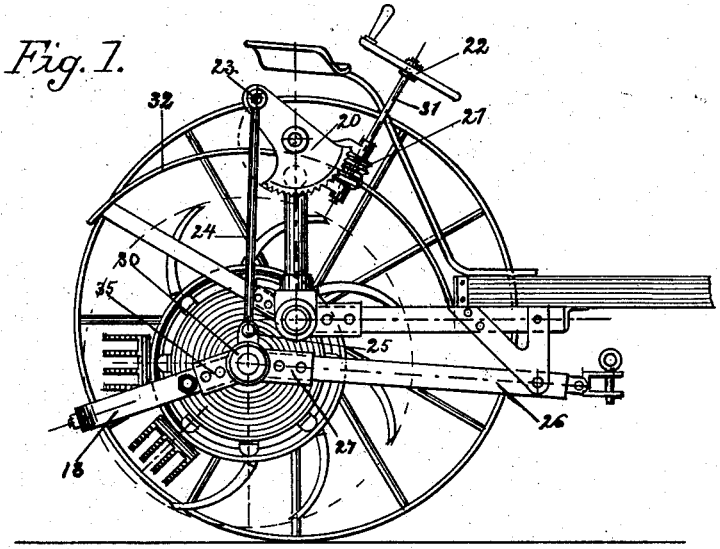
Figure 2:
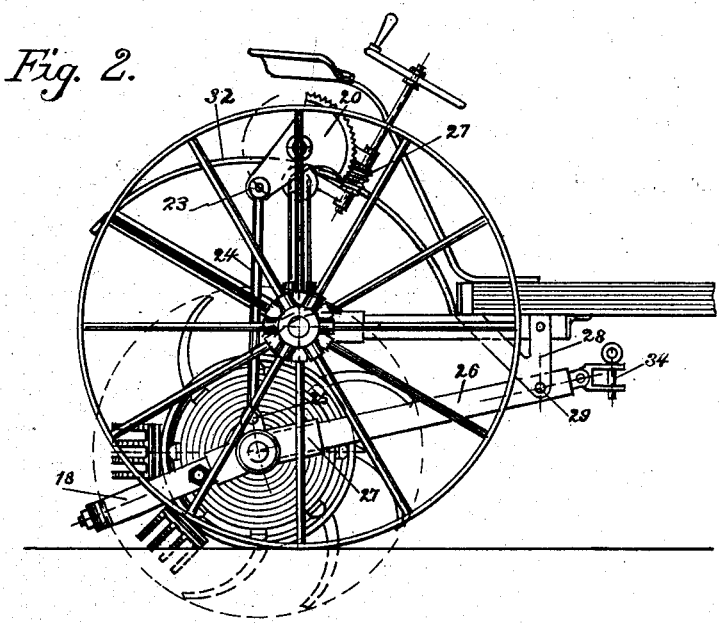
Figure 3:
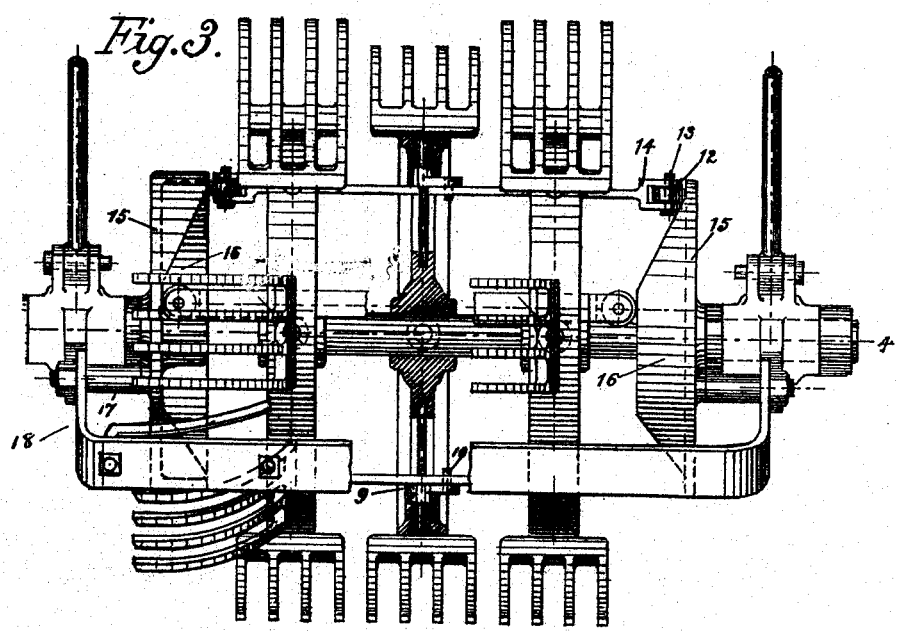
Figure 4:
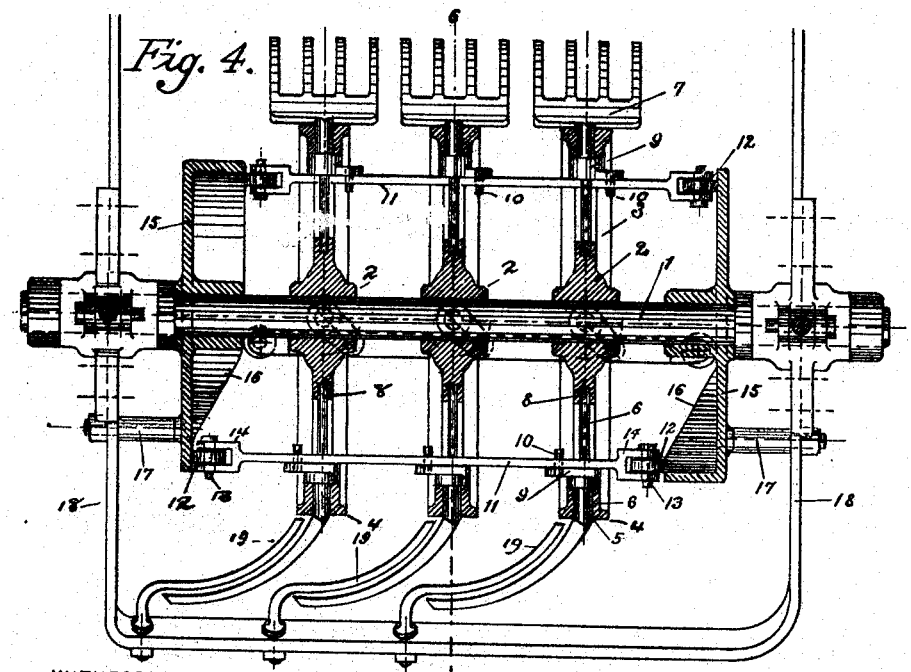
Figure 5:
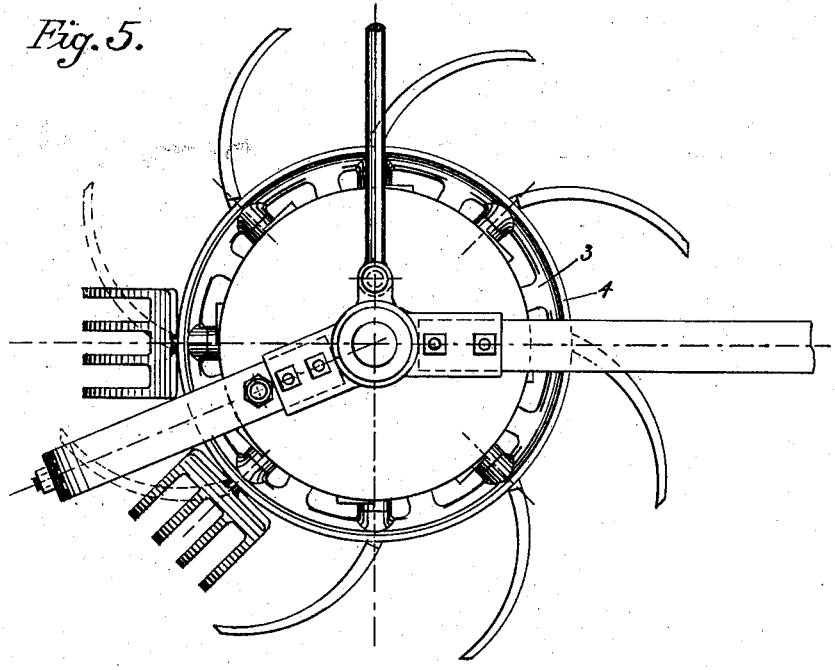
Figure 6:
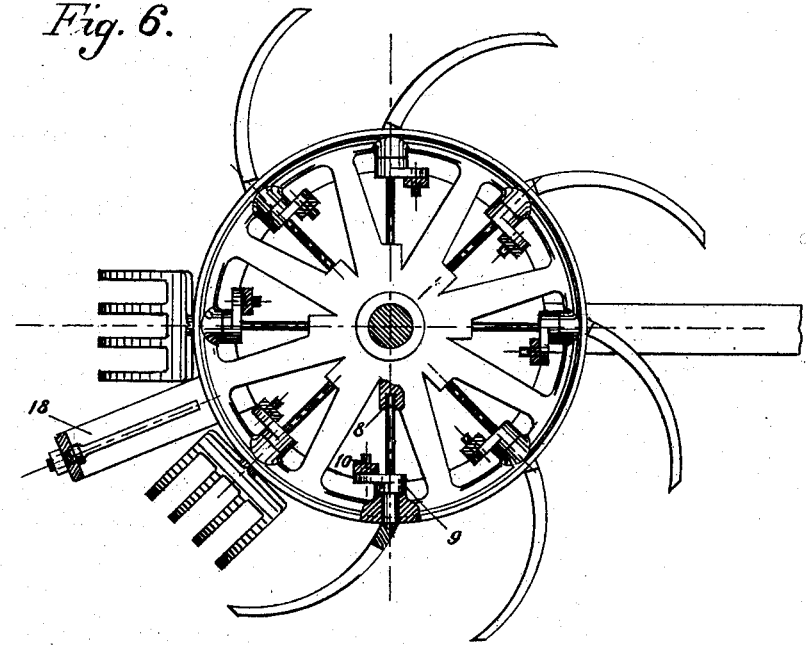

Figure 1 is a side view of my improved plow disengaged. Fig. 2 is a like view showing the plow engaging the soil. Fig. 3 is a rear end view with parts in section. Fig. 4 is a section on the line 4 4, Fig. 3. Fig. 5 is a side view with parts broken away. Fig. 6 is a section on the line 6 6, Fig. 4.

1 is the axle of my improved plow, upon which are mounted hubs 2 of tool-wheels 3, having rims 4, provided with perforations 5, in which are seated the shanks 6 of curved forks 7, said shanks 6 extending downwardly to a suitable socket 8 in hub 2.

9 represents crank-arms rigidly secured in any suitable manner on shanks 6, immediately below rims 4 of tool-wheels 3. Crank-arms 9 are provided at their outer ends with projecting pins 10.

11 represents reciprocating bars, one for each row of forks 7, connected to crank-arms 9 through pins 10. Each end of bars 11 is provided with friction-wheels 12, rotating on pins 13, carried by yokes 14.

15 represents a pair of cam-disks mounted on the axle 1 and each provided with an inturned flange 16, forming a cam-face. Cam-disks 15 are braced rigidly by bars 17, bolted to the scraper-frame 18.

19 represents a series of scraper-blades rigidly mounted on frame 18 and bent into suitable position to remove the earth from the forks when said forks are in position to drop the loosened soil.

27 represents flanges on journal-boxes 30, mounted on each side of axle 1, to which scraper-frame 18 is rigidly secured.

20 is a segmental crank-plate suitably mounted above the plow and provided at its outer end with serrations adapted to engage worm-gear 21 on rod 31, operated by crank 22.

23 is a horizontal crank-pin passing through inner end of the segmental crank-plate 20.

24 represents vertical lifting-bars secured to ears 25 on journal-boxes 30 and on their upper ends to crank-pin 23.

26 is a draft-bar secured at its inner end to flange 27 on journal-box 30, journaled at its outer end to depending angle-plate 28 and having at its outer end a clevis 34.

32 is a guard supported on the carriage-frame to protect the driver from coming in contact with the forks while the plow is in operation.

If so desired, the shank 6 of fork 7 may be attached at either side of the center of the upper edge of the fork, as this construction will allow the forks to be more quickly turned than when the shanks are secured directly in the center.

When not in use, my improved plow is held in an elevated position, so that the same may be transported from place to place without the forks engaging the ground. When it is desired to use the plow, the same is lowered to the desired depth and held in position by means of the adjustable vertical bars. As the carriage proceeds the forks, which at the point of entering the ground are curved rearwardly, will be forced to the desired depth and rising out of the ground will form a scoop, holding the dirt therein until turned by the crank-arms attached to the reciprocating bar. The forks are suitably curved, so that upon entering the ground they neither break nor press the earth forward or back of the entrance until the periphery of the wheel at the base of the fork leaves its contact with the ground.

By having the shanks of the forks seated in the sockets in the hubs of the wheels carrying said forks greater rigidity is given to the fork and the weight of the plow directly utilized in forcing the forks into the soil.

The cam-faced disk is so arranged on the axle that as the forks leave the ground the reciprocating bars, operated by said disks, turn the crank-bars attached thereto, which in turn turn the forks, dumping the earth and allowing the forks to pass between the cleaner-blades. As the forks turn around the axle they are again turned by means of the reciprocating bar meeting the reversed face of the disk and placed in position for again entering the ground. The plow may be raised or lowered by means of the segmental crank-shaft engaging at its inner end a horizontal shaft, to the ends of which are attached the vertical lifting-bars, and having at its inner end serrations engaging a worm-gear on the adjusting-rod, said rod being operated by a hand-wheel in front of the plow-seat. The draft-bar, as shown in the drawings, is attached to the plow-axle instead of to the carrying-gear, thus insuring a more perfect operation of the plow-forks.

I do not wish to be understood as limiting myself to the exact means herein shown for raising the plow from engagement of the soil nor to the exact form of the sulky, as any well-known means may be used for these purposes, nor do I wish to be understood as limiting myself to the exact curve of the forks as herein shown, inasmuch as the same may be varied without departing from the spirit of my invention.

Having thus described my invention, the following is what I claim as new therein and desire to secure by Letters Patent:

1. A plow, comprising an axle, a series of wheels mounted on said axle, a series of forks mounted on said wheels, and means for turning said forks relatively to the axle.

2. A plow, comprising an axle, a series of wheels mounted on said axle, a series of curved forks mounted on said wheels, and means for turning said forks automatically relatively to the axle.

3. A plow, comprising an axle, a series of wheels mounted on said axle, a series of perforations in the peripheries of said wheels, a series of sockets in the hubs of said wheels, a series of forks having shanks inserted through said peripheral perforations and seated in the sockets in said hubs, crank-arms mounted on said shanks, pins in said crank-arms, reciprocating bars having perforations therein engaging said pins, friction-wheels in the ends of said bars, and disks mounted on said axle and having inturned flanges forming cam-faces adapted to engage said friction-wheels.

4. A plow, comprising an axle, a series of wheels mounted on said axle, a series of oscillating forks mounted on said wheels, a scraper-frame mounted on said axle, a series of scrapers mounted on said frame in close proximity to said forks, and means for oscillating said forks.

5. A plow, comprising an axle, a series of wheels mounted on said axle, a series of forks mounted in the periphery of said wheels, crank-arms mounted on said forks and adapted to turn said forks upon the turning of said crank-arms, a reciprocating bar adapted to turn said crank-arms, and means for reciprocating said bar.

6. A plow, comprising an axle, a series of wheels mounted on said axle, a series of perforations in the rims of said wheels, a series of sockets in the hubs of said wheels, and a series of curved forks having shanks extending through said peripheral perforations and seated in said sockets, a reciprocating bar, means for reciprocating said bar, and suitable connection between said bar and said shanks to oscillate said forks upon reciprocation of said bar.

7. A plow, comprising an axle, a series of wheels mounted on said axle, a series of oscillating forks mounted in the peripheries of said wheels, a reciprocating bar suitably connected to said forks to oscillate the same upon the reciprocation of said bar, a pair of disks mounted upon said axle having cam-faces thereon adapted to engage and reciprocate said bar, and suitable means for bracing said disk.

8. A plow, comprising an axle, means on said axle for carrying forks, forks carried by said means, cam-faced disks mounted on said axle, and means operated by said disks for turning said forks.

9. In a plow, the combination with an axle, of a series of digging-tools arranged around said axle and movable to points above and below the soil, of means for automatically turning the digging-tool, separately from its movement above and below the soil to dump the soil therefrom.

10. In a plow, the combination of a digging-tool, means for moving the digging-tool to points below and above the soil to be plowed, and means for moving digging-tool separately from its movement above and below the soil to dump the soil therefrom.

In testimony whereof I affix my signature in presence of two witnesses.

FRANK DINWIDDIE.

Witnesses:
E. F. WINKLER,
BENJ. S. BROWN.